United States Patent

Christensen

[15] 3,686,644

[45] Aug. 22, 1972

[54] GATED DIODE MEMORY

[72] Inventor: Alton O. Christensen, 8906 Valley View Lane, Houston, Tex. 77036

[22] Filed: April 29, 1971

[21] Appl. No.: 138,417

[52] U.S. Cl. ................340/173 R, 307/208, 307/216, 307/238

[51] Int. Cl. ............................................G11c 11/40

[58] Field of Search...340/173 R, 173; 307/216, 238, 307/208

[56] References Cited

UNITED STATES PATENTS 3,533,088 10/1970 Rapp.........................340/173

*Primary Examiner*—Terrell W. Fears
*Attorney*—Harold L. Denkler and John G. Graham

[57] ABSTRACT

A very small and fast-acting memory cell for MOS or MNS circuitry is provided by using a gated diode in place of an IGFET as the memory element of a half-inverter memory array. A preferred space-saving topology of a memory cell in accordance with this invention is shown.

5 Claims, 4 Drawing Figures

Patented Aug. 22, 1972 3,686,644

INVENTOR
ALTON O. CHRISTENSEN
BY John D. Graham
ATTORNEYS

GATED DIODE MEMORY

BACKGROUND OF THE INVENTION

Copending application, Ser. No. 63,535 filed Aug. 13, 1970 discloses a novel type of logic unit, known as a gated diode, which can function either as an inverter or an isolation gate in MOS (metal oxide silicon) or MNS (metal nitride silicon) circuitry. Generally, gated Schottky diodes allow MOS or MNS technology to be used to produce in a single diffusion process circuit elements that (1) have smaller topology than both MOS and bipolar devices, (2) have speeds of fast bipolar circuitry and very much faster, near 2 orders of magnitude, than the usual MOS or MNS circuitry, (3) operate at the voltage and clock levels of TTL bipolar circuitry with one-tenth or less power dissipation at the same clocking rate, (4) are compatible with either MOS, MNS or TTL circuitry.

SUMMARY OF THE INVENTION

The present invention applies the teaching of the aforementioned copending application to the field of random access memory arrays. The memory cell of this invention is termed a "half-inverter" cell because of its analogy to the data-controlled discharging IGFET of a FARMOST (Fast Acting Ratioless Metal Oxide Silicon Transistor) inverter such as that shown in U.S. Pat. Nos. 3,502,908 and 3,502,909.

Basically, the memory cell of the present invention provides a discharge path for a precharged bit line. This discharge path contains two diodes opposing one another, so that normally, no current can flow through the discharge path. One of the diodes, however, is a gated diode, and when the gate electrode is suitably charged, the discharge path is opened to unidirectional current flow. The status of the gate electrode constitutes the memory information, and this information can be refreshed or altered by connecting the gate electrode to the bit line either immediately following a readout or in the presence of a write pulse.

It is the object of the invention to provide a very simple, fast-acting, stable memory cell for nondestructive reading.

It is another object of the invention to provide such a memory cell by connecting a pair of diodes in opposition and controlling the conductivity of one of the diodes by means of a gate electrode subjected to memory information.

DESCRIPTION OF THE PREFERRED EMBODIMENT

Figure 1:
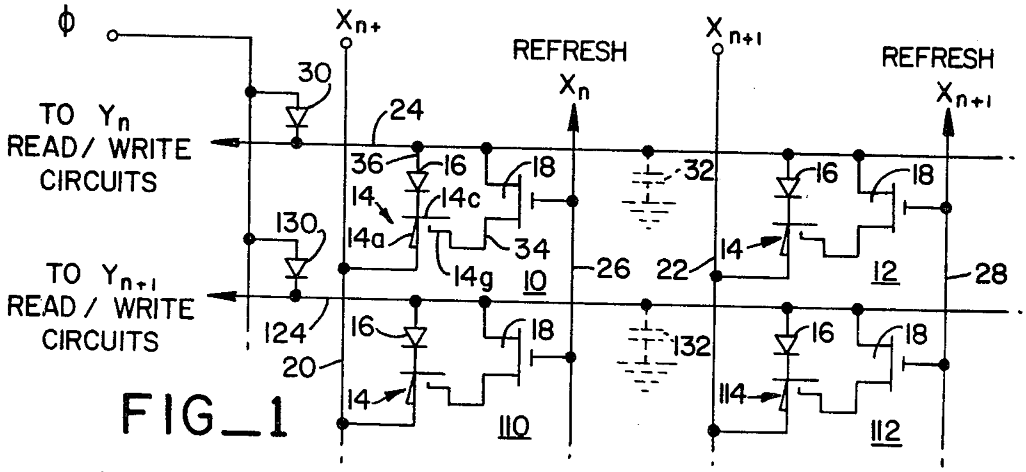
FIG. 1 is a partial circuit diagram of a random-access memory array in accordance with this invention.

FIG. 1 shows an array of four memory cells constructed in accordance with the present invention. Each of the memory cells 10, 12, 110 and 112 is composed of a gated diode 14, a diode 16 and IGFET 18.

The structure and functioning of the gated diode 14 are described in detail in my copending application, Ser. No. 63,535 filed Aug. 13, 1970. Suffice it to say at this point that when the gate electrode 14*g* is at ground, the gated diode 14 acts as a simple diode. When a negative potential (assuming that P-diffusions are used in the silicon chip) is applied to the gate electrode 14*g*, however, the gated diode 14 loses its directional conductivity and becomes a simple ohmic contact. The anode 14*a* of the gated diode 14 is connected to a word line 20 or 22 addressed by the address $X_n$ or $X_{n+1}$, respectively. The gate electrode 14*g* of the gated diode 14 is connected to the bit line 24 or 124 through the source-drain circuit of IGFET 18 whose gate electrode is connected to the refresh line 26 or 28. The bit lines 24, 124 constitute the Y address and are connected to conventional external read/write circuits (not shown).

The diode 16 is connected between the bit line 24 or 124 and the cathode 14*c* of the gated diode 14. The direction of connection of the diode 16 is such that it opposes the current flow through gated diode 14 when the latter is in its diode (i.e., unidirectionally conductive) condition.

Precharge diodes 30, 130 are connected between the clock pulse source $\phi$ and bit line 24 and 124, respectively.

Figure 4:
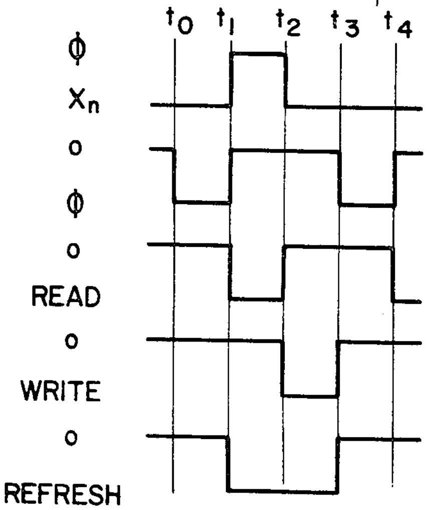
FIG. 4 is a time-amplitude diagram showing the operating sequence of the circuit.

The operation of the circuit is as follows: Assuming the use of negative logic (for a P-diffusion chip), the bit lines 24 and 124 are grounded i.e., precharged to ground potential during the clock pulse $\phi$ (interval $t_0$—$t_1$ in FIG. 4). It will be understood in this connection that the bit lines 24, 124 have capacitances 32, 132, respectively, which are discharged by the clock pulse $\phi$. In the absence of ground potential on bit lines 24, 124, no current flow in any of the memory cells 10, 12, 110, 112 because of the reverse bias imposed upon diodes 16.

When a given word line, say 20, is now addressed by energizing the $X_n$ input (interval $t_1$—$t_2$ in FIG. 4), the capacitances 32, 132 of bit lines 24 and 124, respectively, can become negatively charged from the word line 20 if, and only if, the gated diodes 14 of cell 10 and 110, respectively, are rendered bidirectionally conductive by the presence of a negative potential on their respective gate electrodes 14*g*. Let it be assumed for the purpose of this discussion that such a negative potential exists on the gate electrode 14*g* of the gated diode 14 of cell 10, but not on the gate electrode of the gated diode 14 of cell 120. In that case, at the end of the clock pulse $\phi$ at $t_1$ and the coincident beginning of the $X_n$ address, capacitance 32 of bit line 24 charges from word line 20 through diodes 16 and 14 of cell 10, but bit line 124 remains at ground because its path to word line 20 is blocked in cell 120 by gated diode 14. The condition of bit lines 24 and 124 can be sensed at this point by conventional reading circuitry (not shown) to provide a readout of the information stored in the selected memory cell.

The memory information represented by the potential on the gate electrode 14*g* of any of the gated diodes 14 can be refreshed following (or, for that matter, during) any read operation by enabling IFGETs 18 through refresh line 26 or 28. It will be noted that the potential of bit line 24 or 124 is always the same, after $t_1$, as the potential on the gate electrode 14*g* of the selected memory cell.

New information can be written into the memory cells 10, 12, 110, 112 by applying a write pulse of the proper level (i.e., logic "1" or logic "0") simultaneously with a refresh pulse to a selected bit line-refresh line combination.

Figure 2:
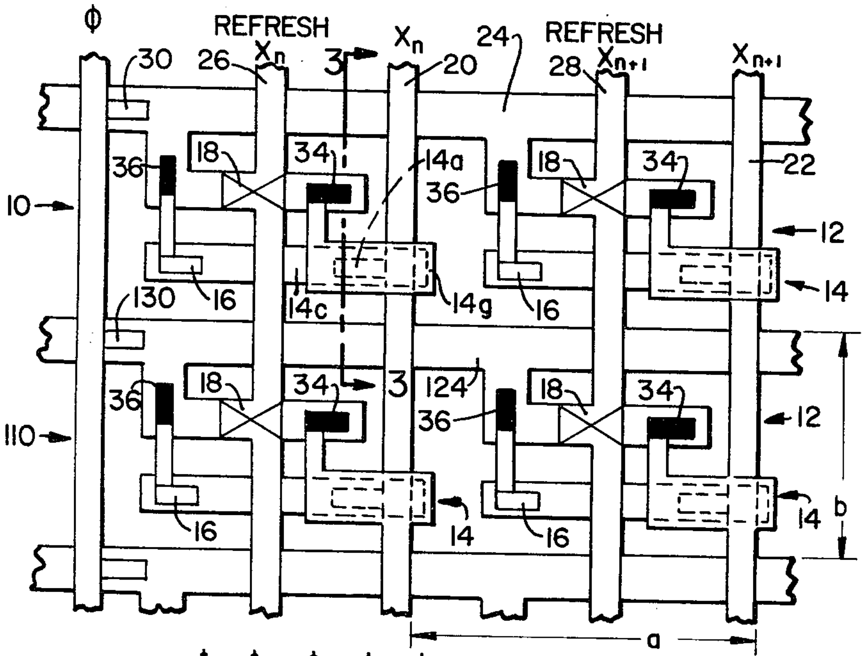
FIG. 2 is a topological diagram of the circuit of FIG. 1.
Figure 3:
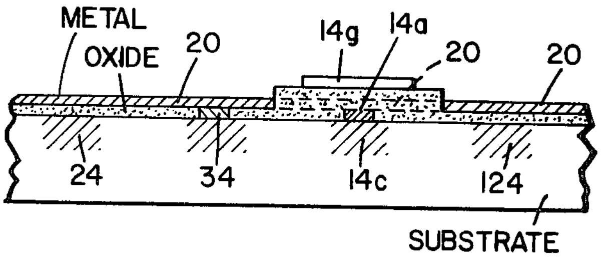
FIG. 3 is a cross-section of a cell of the circuit of FIG. 2 through the silicon substrate taken along the line 3—3 of FIG. 2.

FIGS. 2 and 3 illustrate the topology for carrying out the teachings of the present invention. In FIG. 2, black contacts denote ohmic contacts, while white contacts denote diode-type contacts. Whether a metal-to-diffusion contact is of the ohmic or the diode type depends on the amount of doping used in the diffusion at the contact surface, and either type can be readily produced at any desired location in accordance with well-known production techniques. In FIG. 2 and 3, the ohmic contacts constituting part of the direct interconnections 34, 36 of FIG. 1 are shown in their topological form.

It will be noted that due to its internal interconnections and the use of low-dissipation diode-type components, the memory cell of this invention lends itself to extremely compact topology. In practice, the distances a and b may be approximately 2.5 mils each, resulting in a total cell area of 6.25 square mils. This represents a considerable improvement over the best previously possible size of MOS memory cells.

What is claimed is:

1. A random access memory for MOS-type circuitry, comprising:

a. selectively addressable bit line means;

b. selectively addressable word line means;

c. selectively addressable refresh line means;

d. a source of clock pulses;

e. memory cell means including first diode means and gated diode means connected in opposition to one another between said bit line means and said word line means, and IGFET means having a gate electrode connected to said refresh line means and having its source-drain circuit connected between said bit line means and the gate electrode of said gated diode means; and f. second diode means connected between said clock pulse source and said bit line means for precharging said bit line means.

2. The memory array of claim 1, in which a reading operation is carried out by grounding said clock pulse source so as to discharge said bit line means through said second diode means, then re-energizing said clock pulse source and a selected word line means, and finally determining the charge level of a selected bit line means resulting from the energization of said word line means in the light of the bidirectional conductivity status of the gated diode means connected between said selected word line means and said selected bit line means.

3. The memory array of claim 2, in which means are provided to selectively energize said refresh line means following a reading operation so as to impart to said gate electrode of said gated diode means the potential of said bit line means.

4. The memory array of claim 3, in which writing is performed by impressing upon a selected bit line means a potential consistent with the information to be written, generally concurrently with the energization of a selected refresh line means.

5. A memory cell array for MOS-type circuitry, comprising, on a silicon substrate:

a. first parallel diffusions forming bit line means;

b. second parallel diffusions forming gated diode cathode means and being positioned between said first parallel diffusions;

c. first parallel metallic strips disposed at right angles to said parallel diffusions and forming word line means; said first metallic strips forming gated diode anode means and being connected to said second diffusions by diode contact connections;

d. second parallel metallic strips positioned between said first metallic strips and forming refresh line means;

e. third and fourth diffusions extending generally parallel to said first and second diffusions on each side of said second metallic strip so as to form IGFETs whose gate electrodes are said second metallic strips, said third diffusions being integral with said first diffusions;

f. third metallic strips extending parallel to said first and second metallic strips and having ohmic contact connections to said third diffusions and diode contact connections to said second diffusions; and g. fourth metallic strips extending generally parallel to said first and second metallic strips and having ohmic contact connections at one of their ends to said fourth diffusion, the other of their ends forming gated diode gate electrodes overlying said diode contact connections between said first metallic strips and said second diffusions.

* * * * *